Sept. 5, 1933.   C. L. TOMLINSON   1,925,779
PLOWSHARE ATTACHMENT
Filed June 8, 1932   2 Sheets-Sheet 1

Inventor
Clarence L. Tomlinson
By John P. Hancock
Attorney

Sept. 5, 1933.  C. L. TOMLINSON  1,925,779
PLOWSHARE ATTACHMENT
Filed June 8, 1932   2 Sheets-Sheet 2
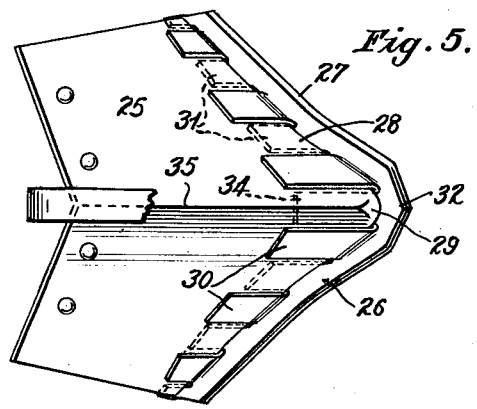
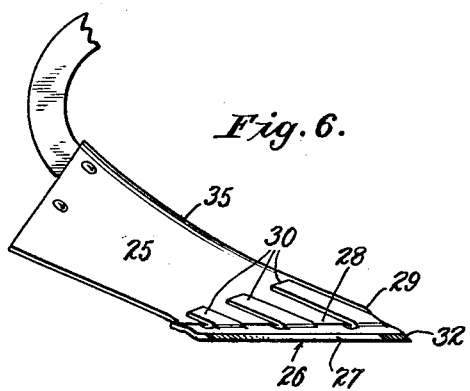
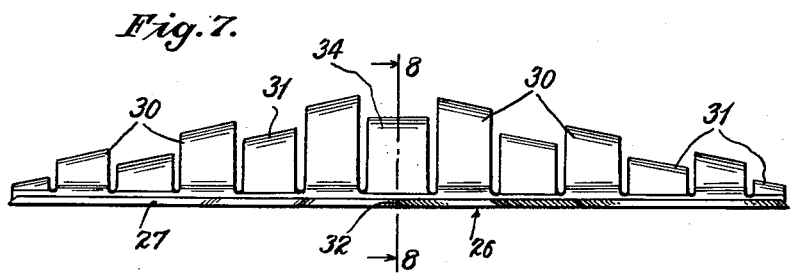
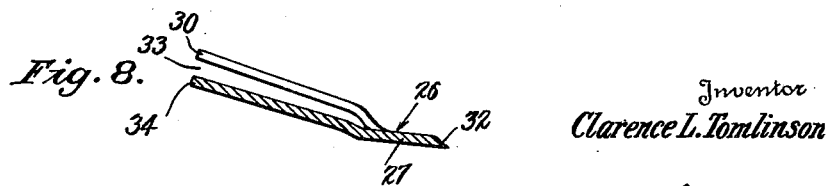
Inventor
Clarence L. Tomlinson
By John P. Hancock
Attorney Patented Sept. 5, 1933

1,925,779

UNITED STATES PATENT OFFICE 1,925,779

PLOWSHARE ATTACHMENT

Clarence L. Tomlinson, Oakland, Calif., assignor, by direct and mesne assignments, to Edwin B. Meissner, St. Louis, Mo.

Application June 8, 1932. Serial No. 616,119

13 Claims. (Cl. 97—125)

This invention relates to new and useful improvements in ploughshare attachments.

A primary object of the invention is to provide an attachment for ploughshares which takes the form of a renewable cutting edge, adapted to be quickly and easily attached to the conventional type of ploughshare and which may be removed from the share when worn out, in order to effect its renewal.

A further important object of the invention is to provide a readily renewable cutting edge for ploughshares which may be applied to the share without the employment of any special tools and which will not require the use of any special securing means necessitating alteration of standard ploughshares.

A still further object of the invention is to provide a renewable cutting edge for ploughshares which may be manufactured at a very nominal cost due to its simplicity of design.

Other and further objects and advantages of the invention will be apparent during the course of the following description.

In the accompanying drawings, forming part of this specification, and in which like numerals are employed to designate like parts throughout,—

Fig. 5 is a top plan view of a modified form of attachment, consisting of a renewable cutting edge for double-furrow types of ploughs, such as lister ploughs;

Fig. 6 is a side-elevational view of the cutting edge attachment illustrated in Fig. 5;

Fig. 7 is a front elevational view of the double-furrow type of cutting edge, illustrated removed from the ploughshare; and Fig. 8 is a transverse, vertical sectional view, taken on a line 8—8 of Fig. 7.

Figure 1:
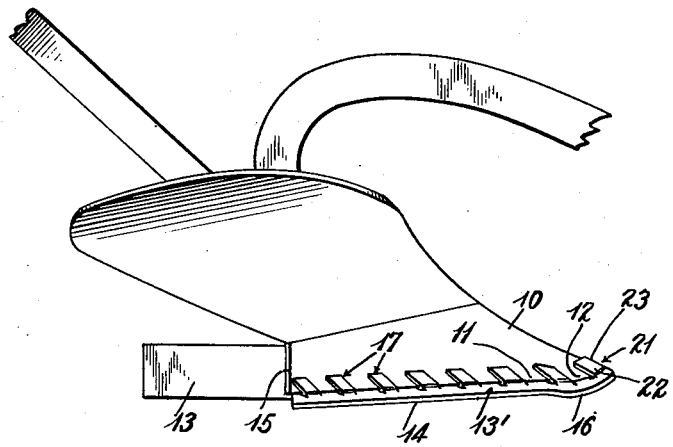
Fig. 1 is a side-elevational view of one form of ploughshare attachment embodying my invention, the same consisting of a renewable cutting edge properly applied to one form of single furrow plough, such as a hand or walking plough.
Figure 2:
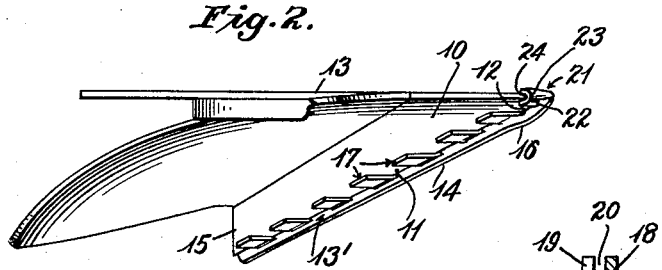
Fig. 2 is a top plan view of the structure shown in Fig. 1.
Figure 4:
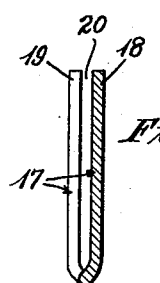
Fig. 4 is a transverse, vertical sectional view, taken on a line 4—4 of Fig. 3.
Figure 3:
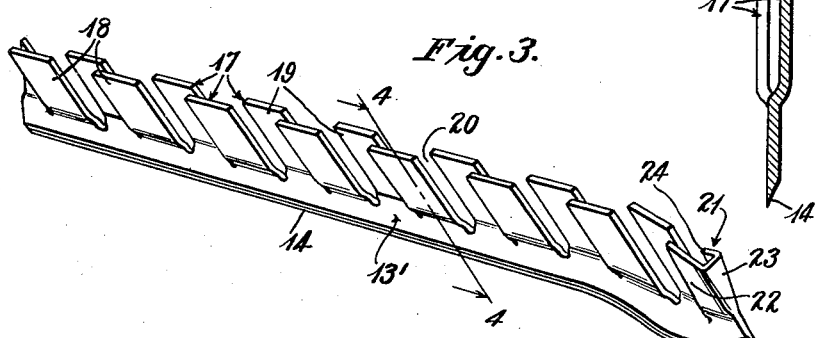
Fig. 3 is a perspective view of the attachment, illustrated removed from the ploughshare.

In the drawings, wherein for purposes of illustration, preferred embodiments of this invention are shown, the numeral 10 designates the ploughshare of a form of plough shown in Figs. 1 and 2. This share has the usual integral cutting edge 11, which, after a certain amount of use, will become worn to such an extent that it no longer will perform its intended work. It has been the practice heretofore to renew the entire ploughshare, but with the attachment embodying this invention, a substitute cutting edge may be readily and quickly applied to the worn out share. It will be understood, of course, that the owner of a plough may proceed at once to use the attachment embodying this invention on his plough or ploughs without waiting until the original share has become worn. The cutting edge 11 of the share 10, in a single-furrow plough, is usually curved slightly in the region 12, adjacent the point or tip of the share. The land side 13 joins the share at this cutting point or tip, and extends substantially in a true vertical plane directly rearwardly from the tip.

The renewable cutting edge shown in Figs. 1 to 4, inclusive, takes the form of an elongated, blade-like body portion 13' which is formed with a cutting edge 14, having the same shape or contour as the conventional cutting edge 11 of the plough with which the attachment is to be used. The length of the blade-like body portion 13' is intended to correspond with the length of the ploughshare 10, and is designed to extend from the tip of the share to its heel portion 15. The cutting edge 14 of the body 13' is curved downwardly at 16 to correspond with the curved portion 12 of the share. The body portion 13' is provided substantially throughout its length with a plurality of fingers 17 which are formed by transversely slitting or cutting the blank from which the attachment is made. These fingers are intended to frictionally grip the lower edge portion of the ploughshare, and for this reason are offset with respect to the plane of the body 13'. These fingers are offset so as to form two parallel series 18 and 19, and alternate fingers are arranged in the same series with the result that adjacent fingers are offset with respect to each other so that they will lie in parallel planes. By referring to Fig. 4, it will be noted that the parallel series of fingers 18 and 19 will form between them a pocket or groove 20 adapted to receive the ploughshare. It is to be understood, of course, that these fingers possess the necessary amount of resiliency to cause them to firmly and tightly grip the opposite faces of a ploughshare, so that when the attachment is driven in place, there will be no danger of its becoming detached. The various figures illustrate the fact that the series of fingers 18 will frictionally contact with the outer face of the share 10, while the series of fingers 19 will frictionally engage the inner face of the share 10.

At the tip or point of attachment of the renewable edge, a socket finger 21 is provided. This finger 21 has a portion 22 which is in alignment with the series of fingers 18. Formed integrally with the portion 22 is a frontal portion 23, extending substantially at right angles to the portion 22, and is intended to overlie the front edge and tip of the share. A third portion 24 is provided for the socket finger 21, arranged substantially in parallelism with the portion 22, so that it will be located substantially in alignment with the series of fingers 19.

In applying this attachment to the ploughshare 10, the lower edge of the share is positioned within the pocket or groove 20 formed between the two series of teeth or fingers 18 and 19, and the attachment then may be driven in place, the fingers thus firmly gripping the opposite faces of the share. The frictional gripping action thus attained will be sufficient to retain the attachment in place until intentionally removed from the share, and the socket finger 21 will function to prevent longitudinal shifting of the attachment with respect to the share. It will be very apparent that when one of these cutting edge attachments becomes worn out, a new attachment may be substituted by merely knocking off the worn attachment and driving a new one onto the share in its place.

The ploughshare attachment illustrated in Figs. 5 to 8, inclusive, embodies the same broad invention as that just described, but is designed to be used with a double-furrow type of plough, or the lister plough 25 specifically illustrated. This attachment consists of a body portion 26 which is substantially V-shaped in plan and is provided with a continuous cutting edge 27, corresponding in design with the cutting edge 28 of the lister plough. In this type of plough, the share is of wedge formation, and is provided with a cutting point or nose 29.

The body portion 26 is formed with two series of fingers 30 and 31 on each side of the nose portion 32. The fingers 30 are intended to overlie the ploughshare or frictionally engage the upper surface of the same. The fingers 31 are intended to underlie the share and frictionally engage the lower surface of the same. By referring to Fig. 8, it will be noted that the fingers in each series on each side of the nose portion 32 are arranged in substantial parallelism so as to form a groove or pocket 33 between the same in order to receive the ploughshare. The center finger 34 belongs to the lower series of teeth or fingers 31 and is positioned so as to underlie the nose 29 of the ploughshare and to extend longitudinally of the edge 35 of the share. These various fingers 30, 31 and 34 possess sufficient resiliency to cause the same to tightly grip the ploughshare frictionally, so that the attachment will not become accidentally removed from the plough. The attachment may be very readily and easily driven into place when the share has been properly positioned within the pocket or groove 33 formed between the fingers 30 and 31, and, on becoming worn out, may be readily removed for replacement, by being driven off from the share.

From the foregoing, it will be obvious that the invention possesses many inherent advantages. The attachment may be manufactured in any desired type of metal, of such degree of hardness or wearing property, as to conform to the desired usage to which the cutting edge of a ploughshare may be put.

While there have been illustrated only two forms of attachments especially designed for two different and general types of ploughs, it is to be understood, of course, that the renewable cutting edge of my invention may be designed for use in connection with other types of earthworking implements, such as, for example, subsoilers, hillside ploughs, cultivators, and the like, by merely shaping the body portion of the attachment to conform to or correspond with the body portion of the implement with which it is to be used and providing the two series of frictional gripping fingers illustrated, so that they will engage the opposite faces of the implement for retention thereon.

It is to be understood further that the forms of the invention herewith shown and described are to be taken as merely illustrative of adaptations of the invention, and that various changes in the size, shape, and arrangements of parts may be resorted to without departing from the spirit of the invention or from the scope of the appended claims.

I claim as my invention:—

1. An attachment for earthworking implements, comprising an elongated body portion having a cutting edge, and a plurality of resilient fingers attached to the body portion and arranged in relatively spaced series.

2. An attachment for earth working implements, comprising a body portion possessing the general contour of the implement with which it is to be used, and two series of gripping fingers connected with the body portion and adapted to frictionally engage opposite surfaces of said implement.

3. An attachment for earthworking implements, comprising a blade-like body portion and gripping fingers associated with said body portion, said fingers being arranged in two longitudinally extending series, with adjacent fingers positioned in different series.

4. A renewable cutting edge for a share, comprising a blade-like body portion having a cutting edge corresponding in contour with the cutting edge of the share, and two series of gripping fingers carried by the body portion and adapted to engage opposite portions of the share.

5. A renewable cutting edge for a share, comprising a body portion adapted to extend the full length of the share and having a cutting edge, and a plurality of friction-gripping fingers formed integral with the body portion and arranged in two series, said fingers being offset with respect to the body portion and with respect to each other so as to form an elongated pocket or groove to receive the lower edge portion of the share.

6. A renewable cutting edge attachment for a share, comprising a body portion and a plurality of gripping fingers carried by the body portion, one of said fingers being adapted to engage the frontal point of the plough to prevent longitudinal movement of the attachment with respect to the plough.

7. A renewable cutting edge attachment for a share, comprising a body portion, a plurality of fingers arranged in spaced series and adapted to grip opposite faces of the plough, and a socket finger carried by the body portion and adapted to receive the point of the plough.

8. A renewable cutting edge attachment for a share, comprising a body portion, a plurality of fingers arranged in spaced series and adapted to grip opposite faces of the plough, and a socket finger carried by the body portion and adapted to receive the point of the plough, said socket finger having portions adapted to engage opposite faces of the plough.

9. A detachable cutting edge for ploughshares, comprising, a metallic strip shaped to conform to the cutting edge of a ploughshare, and spacedly disposed transversely extending gripping fingers on said strip adapted to engage the opposed surfaces of said share.

10. A detachable cutting edge for a share, comprising an elongated body portion, a plurality of relatively spaced gripping elements carried by said body portion, and a socket element carried by one end of the body portion and adapted to receive the point of the plough to retain said attachment against longitudinal movement with respect to the plough.

11. A renewable cutting edge attachment for a share, comprising a body portion corresponding in contour with the cutting edge of the plough, and a plurality of curved fingers carried by the body portion and arranged in groups to engage opposite faces of the ploughshare, certain of said gripping fingers being arranged relative to each other to receive the nose or point of the plough to prevent longitudinal movement of the attachment with respect to the plough.

12. A detachable cutting edge for a ploughshare, comprising a strip of flat metal split transversely at intervals and formed to permit alternate portions that are split to be separated and adapted to be mounted on a ploughshare, said split portions causing a friction grip on both sides of the ploughshare.

13. A detachable cutting edge for a ploughshare, comprising a strip of metal cut at intervals transversely, each split strip being bent transversely in opposite directions to form means between the strips to receive the ploughshare to substantially retain the device on said share.

CLARENCE L. TOMLINSON.